US011037021B2

(12) United States Patent
Alabdulmohsin

(10) Patent No.: US 11,037,021 B2
(45) Date of Patent: Jun. 15, 2021

(54) QUASI-CLIQUE PROTOTYPE-BASED HYBRID CLUSTERING

(71) Applicant: King Abdullah University of Science and Technology, Thuwal (SA)

(72) Inventor: Ibrahim Mansour Alabdulmohsin, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 100 days.

(21) Appl. No.: 16/340,601

(22) PCT Filed: Oct. 10, 2017

(86) PCT No.: PCT/IB2017/056262
§ 371 (c)(1),
(2) Date: Apr. 9, 2019

(87) PCT Pub. No.: WO2018/069836
PCT Pub. Date: Apr. 19, 2018

(65) Prior Publication Data
US 2019/0311219 A1 Oct. 10, 2019

Related U.S. Application Data

(60) Provisional application No. 62/406,103, filed on Oct. 10, 2016.

(51) Int. Cl.
| G06K 9/62 | (2006.01) |
| G06F 16/28 | (2019.01) |
| G06F 16/901 | (2019.01) |

(52) U.S. Cl.
CPC ......... *G06K 9/6224* (2013.01); *G06F 16/285* (2019.01); *G06F 16/9024* (2019.01); *G06K 9/6265* (2013.01)

(58) Field of Classification Search
CPC .... G06K 9/6224; G06K 9/6265; G06K 9/342; G06F 16/285; G06F 16/9024; G06T 7/162
See application file for complete search history.

(56) References Cited

U.S. PATENT DOCUMENTS

| 5,832,182 A | 11/1998 | Zhang et al. |
| 5,857,179 A | 1/1999 | Vaithyanathan et al. |
| 5,864,855 A | 1/1999 | Ruocco et al. |
| 6,038,574 A | 3/2000 | Pitkow et al. |

(Continued)

OTHER PUBLICATIONS

B. Yan and S. Gregory, "Detecting communities in networks by merging cliques," 2009 IEEE International Conference on Intelligent Computing and Intelligent Systems, Shanghai, 2009, pp. 832-836, doi: 10.1109/ICICISYS.2009.5358036. (Year: 2009).*

(Continued)

Primary Examiner — Siamak Harandi
(74) Attorney, Agent, or Firm — Billion & Armitage

(57) ABSTRACT

Embodiments of the present disclosure describe a clustering scheme and system for partitioning a collection of objects, such as documents or images, using graph edges, identification of reliable cluster groups, and replacement of reliable cluster groups with prototypes to reconstruct a graph. The process is iterative and continues until the set of edges is reduced to a predetermined value.

16 Claims, 2 Drawing Sheets

(56) References Cited

U.S. PATENT DOCUMENTS

| | | | |
|---|---|---|---|
| 6,104,835 A * | 8/2000 | Han | G06K 9/6274 |
| | | | 382/159 |
| 6,598,054 B2 | 7/2003 | Schuetze et al. | |
| 6,654,739 B1 | 11/2003 | Apte et al. | |
| 6,654,743 B1 | 11/2003 | Hogg et al. | |
| 7,765,212 B2 | 7/2010 | Surendran et al. | |
| 2010/0004925 A1 | 1/2010 | Ah-Pine et al. | |
| 2013/0294690 A1 | 11/2013 | Urbach et al. | |

OTHER PUBLICATIONS

Gergely Zahoránszky-Kőhalmi, Cristian G. Bologa and Tudor I. Oprea, " Impact of similarity threshold on the topology of molecular similarity networks and clustering outcomes", Published: Mar. 30, 2016, Journal of Cheminformatics, 2016, 8:16 DOI 10.1186/s13321-016-0127-5 (Year: 2016).*

Notification of Transmittal of the International Search Report and the Written Opinion of the International Searching Authority, or the Declaration for PCT/IB2017/056262 dated Jan. 19, 2018.

Edachery, et al., "Graph Clustering Using Distance-k Cliquesq", In: Network and Parallel Computing:, Springer International Publishing, Cham 032548, vol. 1731, Jan. 1, 1999, 98-106.

Brunato, et al., "On Effectively Finding Maximal Quasi-cliques in Graphs", Lion 2007 II, LNCS 5313, 2008, 41-55.

Defays, "An efficient algorithm for a complete link method", The Computer Journal, vol. 20, No. 4, 1977, 364-366.

Dempster, et al., "Maximum Likelihood from Incomplete Data via the EM Algorithm", Journal of the Royal Statistical Society. Series B (Methodological), vol. 39, No. 1, 1977, 1-38.

Ester, et al., "A density-based algorithm for discovering clusters in large spatial databases with noise", KDD-96, 1996, 226-231.

Feige, et al., "The Dense k-Subgraph Problem", Algorithmica 29, Sep. 6, 2000, 410-421.

Fränti, et al., "Fast PNN-based Clustering Using K-nearest Neighbor Graph", IEEE International Conference on Data Mining (ICDM), IEEE, 2003, 525-528.

Hartuv, et al., "A Clustering Algorithm based on Graph Connectivity", Information processing letters, 76(4), 2000, 175-181.

Ng, et al., "Efficient and Effective Clustering Methods for Spatial Data Mining", http://dl.acm.org/citation.cfm?id=645920.672827, 1994, 144-155.

Schaeffer, "Graph clustering", Computer Science Review I, Aug. 2007, 27-65.

Sibson, "SLINK: An optimally efficient algorithm for the single-link cluster method", The Computer Journal, vol. 16, No. 1, 1973, 30-34.

Ward, "Hierarchical Grouping to Optimize an Objective Function", Journal of the American Statistical Association, Vol. 58, No. 301, Mar. 1963, 236-244.

* cited by examiner

QUASI-CLIQUE PROTOTYPE-BASED HYBRID CLUSTERING

BACKGROUND

Cluster analysis or clustering is the task of grouping a set of objects in such a way that objects in the same group (called a cluster) are more similar (in some sense or another) to each other than to those in other groups (clusters). It is a key task of exploratory data mining, and a common technique for statistical data analysis, used in many fields, including machine learning, pattern recognition, image analysis, information retrieval, bioinformatics, data compression, and computer graphics.

Cluster analysis itself is not one specific algorithm, but the general task to be solved. It can be achieved by various algorithms that differ significantly in their notion of what constitutes a cluster and how to efficiently find them. Popular notions of clusters include groups with small distances among the cluster members, dense areas of the data space, intervals or particular statistical distributions. Clustering can therefore be formulated as a multi-objective optimization problem. The appropriate clustering algorithm and parameter settings (including values such as the distance function to use, a density threshold or the number of expected clusters) depend on the individual data set and intended use of the results. Cluster analysis as such is not an automatic task, but an iterative process of knowledge discovery or interactive multi-objective optimization that involves trial and error. It is often necessary to modify data preprocessing and model parameters until the result achieves the desired properties.

Cluster analysis is commonly categorized under the broad field of unsupervised learning techniques because a "correct" solution is often undefined or unavailable. As a result, many clustering algorithms have been developed to achieve heuristic goals. In the popular k-means algorithm, for instance, clusters are assigned such that the sum of differences (or distances) between each object and its assigned cluster is small. This algorithm assumes that the number of clusters, k, is known beforehand.

Another closely related algorithm is the Gaussian mixture model, which is similar in spirit to the k-means algorithm and is often solved using the Expectation-Maximization (EM) procedure. In the Gaussian mixture model, the goal is to maximize the likelihood of the clustering assignments. It assumes a definite probability distribution on the data objects.

Moreover, a third family of clustering algorithms is connectivity based clustering, which are designed to optimize the "distance" between clusters. This latter family of methods, such as "single-linkage" clustering and "complete linkage" clustering, differ from each other in how they measure the distance between clusters.

In some clustering applications, however, two distinctive characteristics are present. First, there exists a single correct clustering assignment. Second, the homogeneity and separation assumptions are satisfied, whereby each of a pair of objects in the same (correct) cluster tends to be similar to each other, whereas objects across different clusters tend to be dissimilar. Examples of applications that satisfy these characteristics include news aggregation and social network event detection.

In a news aggregation application, a large collection of articles are clustered into news stories, where each article in the same cluster describes the same news story. In this application, either assigning articles that describe the same story into two different clusters or assigning articles that describe different stories into the same cluster would be erroneous.

In a social network event detection application, a collection of short texts, such as tweets in Twitter or public statuses in Facebook, are clustered into groups according to their contents in such a way that short texts describing the same event are grouped together in the same cluster. The size and age of the cluster are, in turn, used to determine the importance and urgency of the respective event.

Similarly, in an image search and retrieval application, a large collection of images can be clustered according to content similarity. This allows search engines to avoid duplicate results and to improve user experience.

In a traditional clustering setting, there is no objectively "correct' clustering algorithm. Hence, most traditional clustering algorithms are designed to optimize some heuristic scores instead and the most appropriate clustering algorithm for a particular problem often needs to be chosen experimentally, unless there is a mathematical reason to prefer one cluster model over another. In the popular k-means algorithm, for example, the sum of differences (or distances) between objects and their clusters is minimized. In probabilistic methods, such as the Gaussian mixture models, the probabilistic likelihood is maximized via the iterative Expectation-Maximization (EM) procedure. In connectivity-based clustering, which includes algorithms such as the single-linkage method and the complete-linkage method, the distance between clusters is minimized. Other heuristic scores have been proposed as well, including the Davies-Bouldin index and the Silhouette coefficient.

However, in some clustering settings, such as news aggregation, event detection in social networks, and image clustering, a different set of requirements is imposed. In these settings, there does exist a well-defined notion of "clustering accuracy". In news aggregation, for example, a large collection of articles is clustered into news stories, where each article in the same cluster is supposed to describe the same news story. In this application, either assigning articles that describe the same story into two different clusters or assigning articles that describe different stories into the same cluster would be erroneous. Therefore, the goal here is not to optimize some artificial score. Rather, the primary objective is to improve the accuracy of the clustering results.

Therefore, the goal of these applications is to maximize the accuracy of the clustering method, which is a non-heuristic well-defined performance indicator. Generally, clustering algorithms that have been designed to optimize some alternative heuristic scores, such as distance or likelihood, do not perform well for such applications because they are not designed from the outset to maximize the clustering accuracy.

SUMMARY

In general, embodiments of the present disclosure describe methods for clustering. Accordingly, embodiments of the present disclosure describe clustering methods yielding correctness (there exists a single correct clustering assignment), homogeneity (any two objects in the same correct cluster tend, on average, to be similar to each other), and separation (objects in different clusters tend, on average, to be dissimilar to each other).

Embodiments of the present disclosure provide a highly accurate clustering assignment even when data is contaminated with noise or outliers. In one embodiment of the present disclosure, a new cluster is identified by partitioning the similarity graph into connected components and by identifying the largest clique in each connected component. Then, the largest cluster is collapsed into a single node and the graph is reconstructed afterward, with some similarities recomputed. The entire process is repeated until all nodes are isolated in the graph. The primary feature of this method is that it is clique-driven. It is a greedy algorithm, which has an important advantage over the popular k-means algorithm in that it does not require that the number of clusters be specified in advance. It can be used to cluster any objects, such as images, texts, and sequences, provided that a similarity score can be defined on those objects. It is also quite different from both "agglomerative clustering" and "hierarchical clustering". In an agglomerative clustering, every node forms its own cluster, and clusters are merged to form new clusters in a bottom-up fashion. In hierarchical clustering, a top-down approach is taken, where all nodes initially belong to the same cluster, which cluster is divided into smaller clusters afterward.

One embodiment of the present disclosure, by contrast, uses graph edges as evidence of reliability. It identifies the largest clique as the most reliable cluster. Then, this cluster is collapsed into a single object (prototype) and the graph is reconstructed. Iteratively, the method identifies the largest clique in the new graph to be the new cluster, which can include the previous cluster as well. Hence, it is a bottom-up approach, which is similar to agglomerative clustering, but it is clique-centric to provide more reliable results.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

The invention of the present disclosure relates to cluster analysis and clustering methods. One embodiment of the present disclosure describes a hybrid method between the general family of "quasi-clique" clustering algorithms, such as the Highly Connected Subgraph (HCS) algorithm, and "prototype-based" clustering algorithms, of which the k-means algorithm is most well-known.

Figure 1:
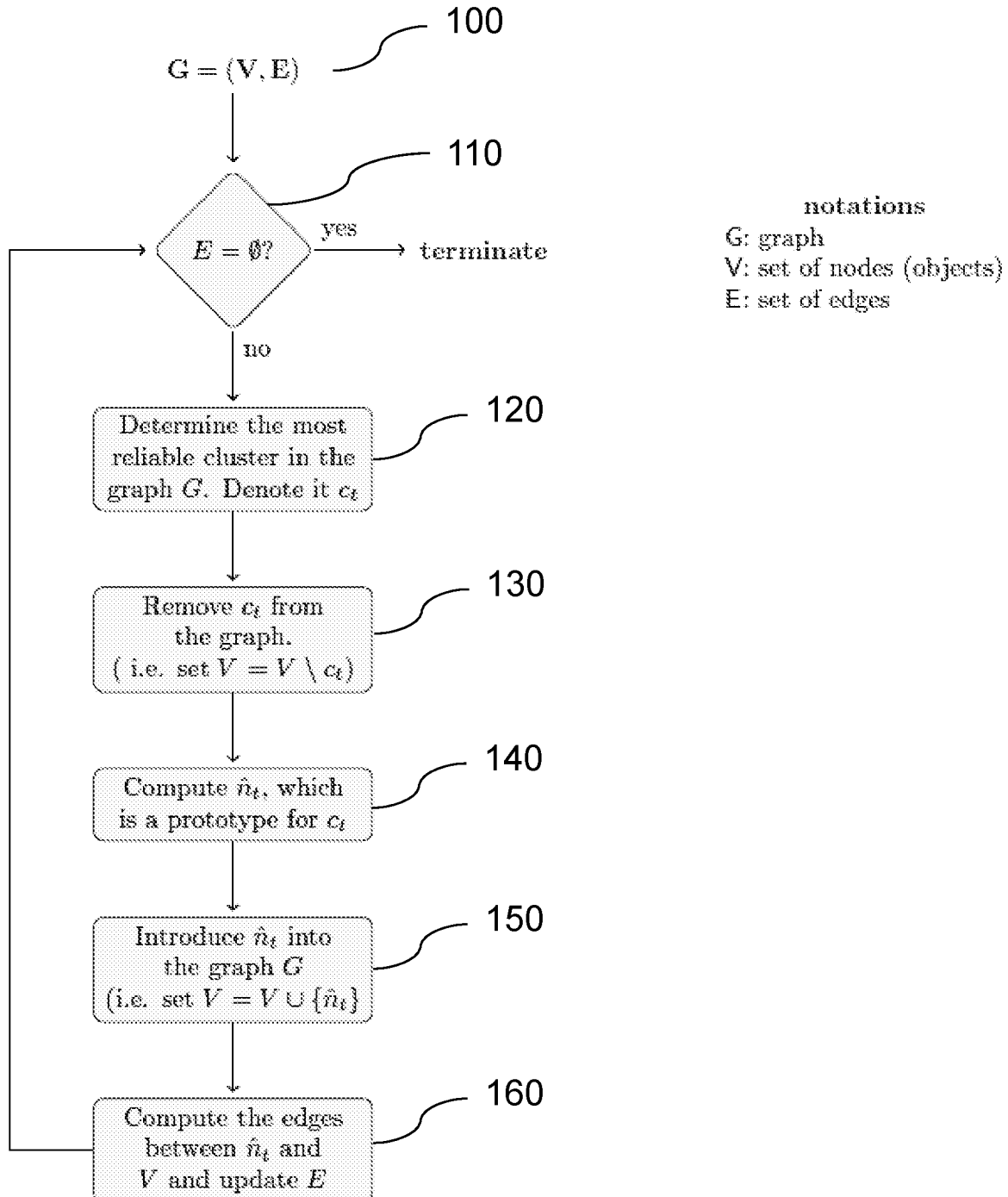
FIG. 1 illustrates a process flow diagram for a clustering scheme in accordance with one or more embodiment of the present invention.

FIG. 1 illustrates a high-level flow diagram of a clustering method in accordance with the present invention. Initially, object-to-object similarity is encoded in an undirected, unweighted graph G=(V, E), where V is the set of objects (or nodes) and E is the set of unweighted edges, as indicated by numeral 100. At step 110, the set of edges, E, is evaluated and the process is terminated if E=0. If E≠0, then the most reliable cluster in graph, G, is identified at step 120. Ideally, the most reliable cluster is the largest clique in the graph. At step 130, the identified cluster is removed from the graph. This signifies that all nodes in the group are permanently assigned to the same cluster, although the cluster itself is subject to change in future iterations. At step 140, a new node is computed and introduced as a prototype (i.e. representative) to the cluster (denoted $\hat{n}_t$ in FIG. 1) at step 150. This prototype can, for instance, be the mean of the cluster or its medoid. The edges between the new prototype node $\hat{n}_t$ and all remaining nodes in the graph are recomputed at step 160. The process is repeated until all nodes in the graph are completely isolated.

The method describes a process for partitioning objects into accurate clusters. It is assumed that the process can measure the similarity score between any two arbitrary objects. Given two objects $n_i$ and $n_j$, $S(n_i, n_j)$ denotes their similarity score. It is also assumed that there exists a known threshold κ>0, such that if for two objects $n_i$ and $n_j$, we have $S(n_i, n_j) \gg \kappa$, then the two objects are more likely to have come from the same cluster. Conversely $S(n_i, n_j) \ll \kappa$ implies that the two objects $n_i$ and $n_j$ are unlikely to have come from the same cluster. It is not assumed that the similarity score is perfect. The process is thus capable of handling noise and outliers. This threshold κ can be estimated from data. It is further assumed that for any collection of objects $\{n_1, n_2, \ldots, n_k\}$, there exists a procedure for finding a prototype to the collection of objects. If the objects are numeric, for instance, then the prototype can be the mean or median. Otherwise, the prototype can be a medoid. In a news aggregation example, news articles are represented using the bag-of-words representation, and the mean (average) of a collection is used as its prototype.

As described above, the first step of the clustering process is computing the pairwise similarity between any two objects. Let G=(V, E) be a graph, where V is the set of all objects of interest. If $S(n_i, n_j) \geq \kappa$ for $n_i, n_j \in V$, then an edge is added between nodes $n_i$ and $n_j$ in the graph G. Otherwise, no edge connects the two nodes $n_i$ and $n_j$.

In order to obtain accurate results, the process proceeds in an iterative greedy manner. At each round of the process, the most reliable cluster is identified. Ideally, the most reliable cluster is the largest clique in the graph. However, determining the largest clique is a computationally difficult problem. The most straightforward approach is to use an approximation algorithm, such as the algorithms of Brunato et al. (2007) and Feige et al. (2001). Another approach is to increase the threshold κ until the size of the largest connected component in the graph is below a specified maximum number. The second approach is used in the examples herein.

Once a collection of objects $c_t = \{v_1, v_2, \ldots, v_m\}$ is identified as the next most reliable cluster, all of its nodes are removed from the graph G and a new prototype node is inserted to replace the entire cluster. More precisely, the new graph G'=(V',E') is defined by: $V' = V \setminus c_t \cup \{\hat{n}_t\}$ $E' = \{(u,v) \in E : u \in V' \wedge v \in V'\}$ The rationale behind this approach is twofold. First, by identifying the most reliable cluster, the clustering accuracy is maximized. Second, by substituting a prototype for a cluster, the similarity scores between the prototype and the rest of the graph become a more reliable indicator of similarity since a prototype is, by construction, an aggregation of multiple nodes in the cluster. In our embodiment for news aggregation, for instance, a single news story can be conveyed in various ways. However, the differences between news articles that describe the same news story is generally attributed to superficial factors, such as writing styles. By forming a prototype, such superficial differences are removed and the resulting prototype becomes a more representative object to the original news story.

Once the cluster is removed and a single prototype is inserted in its place, the process proceeds by examining the similarity between the prototype and all of the remaining nodes (i.e. objects) in the graph. Let $\hat{n}_r$ denote the new prototype node and let $n_i$ be some other object in the graph G'. If $S(\hat{n}_r, n_i) \geq \kappa$, an edge is added between $\hat{n}_r$ and $n_i$ into E'. Otherwise, no edge connects the two nodes directly in the graph. Once all of the edges are determined, the process is repeated in the new graph, where the next most reliable cluster is identified. Because the next most reliable cluster can contain prototype nodes, clusters that have been found in previous rounds may be merged together in future rounds.

A process for breaking ties is also defined. If two clusters are found to be of the same reliability (e.g. clique size), then the priority of a cluster is determined by the sum of priorities of its node. For example, a priority of a node may be equal to the size of the cluster it represents if it is a prototype, or is one otherwise.

FIG. 2 depicts the clustering process as applied to a small similarity graph. In FIG. 2a, the original similarity graph is shown. The nodes of the graph are the objects to be clustered, where the shading of a node represents the cluster it belongs to. Due to imperfections in the similarity score, imperfections in the threshold $\kappa$, or due to noise, the nodes are not perfectly separated in the graph according to their true clustering assignment. Hence, a reliable process for identifying the clusters is desired.

Figure 2A:
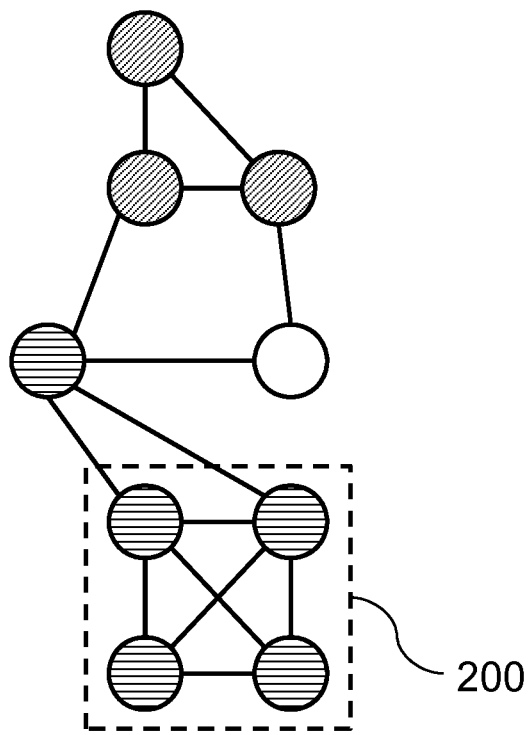
FIGS. 2A-D illustrates a conceptual graph diagram of a clustering process using the scheme of FIG. 1.
Figure 2B:
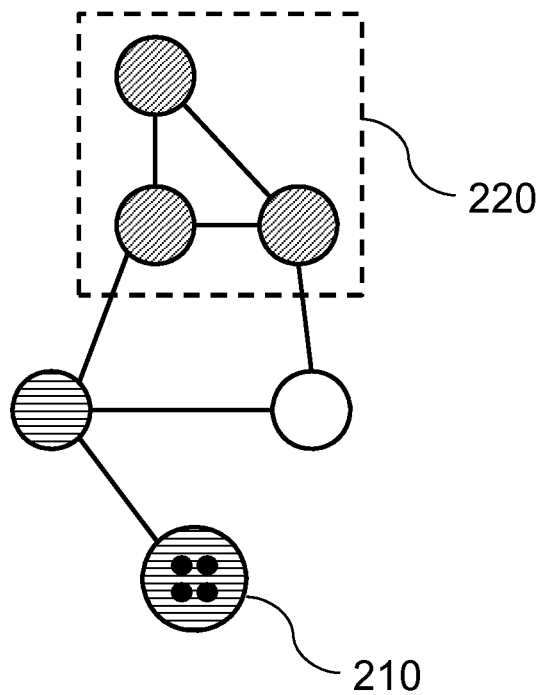

The first step of the process is to identify the most reliable cluster, which in this example is the largest clique in the graph. This cluster is contained within region 200 in FIG. 2a. Next, all of the four nodes are removed and the entire cluster 200 is replaced with a single prototype 210, which is marked with a larger size in FIG. 2b. FIG. 2b shows the new graph after all edges have been recomputed.

Figure 2C:
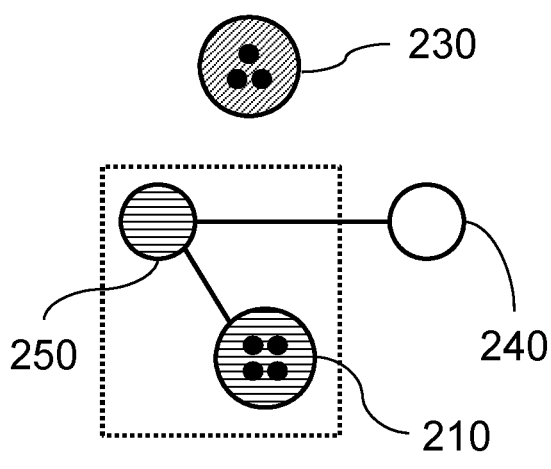

Next, the process identifies the most reliable cluster in the new graph. This cluster is identified as 220 FIG. 2b. Again, the cluster is removed and is replaced with a single prototype node 230 as shown in FIG. 2c. FIG. 2c shows the final graph when edges are recomputed. Here, it is noted that after aggregating the upper cluster with its prototype 230, its original apparent similarity to node 240 is no longer present because aggregation improves the reliability of similarity functions.

Figure 2D:
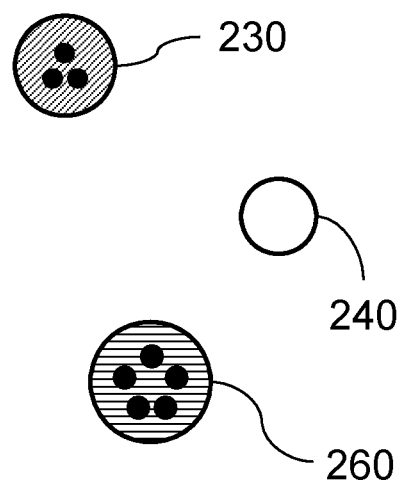

Next, the process looks for the most reliable cluster in the new graph. A tie exists between two clusters comprised of two nodes each. The first cluster connects node 240 with the top node 250. The second cluster connects node 250 with the prototype node 210. Because ties are broken according to the priority of the nodes, the cluster that contains the prototype node is selected. Once it is replaced with a single prototype 260 and edges are recomputed, all of the remaining nodes (230, 240, 260) in the graph are isolated as shown in FIG. 2d. Hence, the algorithm terminates.

One variant that can be used alleviates the computational burden of finding the maximum cliques in the graph. Instead of operating on the entire graph, the graph can be partitioned, first, into connected components. Then, the process is applied to each connected component separately. Once the process terminates, isolated nodes remain for each connected components. These nodes are, next, merged into a bigger graph, with edges being recomputed. The process is applied again to this new entire graph. The purpose of this approach is to speed up the algorithm and to reduce memory consumption. In one example embodiment, the process was implemented on a single quad-core workstation, and handled collections of over 50,000 objects in less than 15 minutes.

Another closely related variant is local clustering, which is most suitable for extremely large graphs that cannot be processed by a single workstation. Instead of partitioning a graph into connected components, the graph can be partitioned into multiple subgraphs. This can be embodied by, first, sampling at random from nodes according to their degrees, and, second, by traversing the neighborhood of the sampled nodes in a depth-first (DFS) manner. The clustering process can, then, be implemented on those separate subgraphs by separate machines running in parallel, and the resulting prototypes can be merged together into a bigger graph. The process is repeated in the bigger graph afterward.

Other variants can be made for the choice of the prototype nodes as well. If objects are numeric, then the prototype node may correspond to the mean or average of the objects of the cluster. Otherwise, a medoid can be used instead. Two examples of medoids 1. Maximizing the minimum similarity to other nodes in the cluster:

$$\text{prototype}(\{n_1, n_2, \ldots, n_m\}) = \arg\max_{1 \leq i \leq m} \min_{1 \leq j \leq m} S(n_i, n_j)$$

2. Maximizing the average similarity to all other nodes in the cluster:

$$\text{prototype}(\{n_1, n_2, \ldots, n_m\}) = \arg\max_{1 \leq i \leq m} \sum_{1 \leq j \leq m} S(n_i, n_j)$$

Many algorithms have been proposed for object clustering, including quasi-qlick clustering methods. The most prominent example is the Highly Connected Subgraph (HCS) algorithm (Hartuv and Shamir, 2000). In HCS, clustering proceeds in a top-bottom fashion. At each round, a cluster is identified by the size of its cut from the rest of the graph. Variants of this algorithm have been proposed, such as by using the normalized cut or conductance (Schaeffer, 2007). The embodiments of the present invention, by contrast, operate in a bottom-up fashion, using cliques instead of minimum cuts, and using prototypes with graph transformations to update the clustering assignment at each round.

Another class of closely-related clustering algorithms are spectral methods (Schaeffer, 2007). These methods form variants of the Laplacian matrix of the graph and infer clustering assignments via eigenvalue decomposition. In contrast, embodiments of the present provide a greedy iterative process that is designed to improve the clustering accuracy by combining the merits of both quasi-clique methods with prototype-based methods.

Furthermore, agglomerative algorithms, such as the pairwise nearest neighbor method (Franti et al., 2003) or the Wards method (Ward Jr, 1963), are similar to the present method in that they all operate in a bottom-up fashion. In traditional agglomerative methods, a distortion function, such as the sum of distances, is used to select the two clusters to merge at each iteration. In contrast, distortion functions are not used in some embodiments of the present invention. Instead, multiple nodes can be merged together at a single round by identifying the largest clique in the graph, or some approximation to it. In addition, agglomerative methods do not form prototypes to improve the clustering accuracy, which is a key process of embodiments of the present invention.

What is claimed is:

1. A method for clustering similar objects together, the method comprising:
   evaluating pairwise similarity between a set of objects to define a set of edges between multiple nodes of a graph;
   identifying a most reliable cluster of nodes within the graph;
   defining a first prototype node and replacing the reliable cluster of nodes with the first prototype node;
   evaluating pairwise similarity between the first prototype node and other remaining nodes of the graph to define a first set of edges between multiple nodes of the graph;
   identifying a next most reliable cluster of nodes within the graph by increasing a threshold $\kappa$ until a size of a largest connected component in the graph is below a specified maximum number;
   defining a second prototype node and replacing the next most reliable cluster of nodes with the second prototype node;
   evaluating pairwise similarity between the second prototype node and remaining nodes of the graph to define a second set of edges between multiple nodes of the graph; and
   repeating said identifying the next reliable cluster of nodes, defining subsequent prototype nodes, and evaluating pairwise similarity between the subsequent prototype nodes and remaining nodes of the graph until no similarity exists between the nodes of the graph.

2. The method of clustering similar objects together of claim 1, wherein the most reliable cluster of nodes is the largest clique of the graph.

3. The method of clustering similar objects together of claim 1, wherein said identifying a reliable cluster of nodes includes an approximation algorithm.

4. The method of clustering similar objects together of claim 1, wherein said defining a prototype node includes using a mean or median of the cluster or its medoid.

5. The method of clustering similar objects together of claim 1, wherein said identifying the reliable cluster of nodes within the graph includes partitioning the graph to define isolated nodes for each partition segment and then merging the nodes.

6. The method of clustering similar objects together of claim 1, wherein said identifying the reliable cluster of nodes includes partitioning the graph into connected subcomponents and applying a clustering process to each of the connected subcomponents.

7. A method of clustering objects comprising:
   establishing pairwise similarity between two objects in a graph, $G=(V, E)$, where V is a set of objects of interest, with a set of edges, E, defined between nodes $n_i$ and $n_j$ in graph G, according to $S(n_i,n_1) \geq \kappa$ for $n_i, n_j \in V$;
   identifying a most reliable cluster of nodes within the graph G;
   defining a first prototype node and replacing the most reliable cluster of nodes with the first prototype node;
   updating the graph, G, to $G'=(V', E')$, with $V'=V\backslash c_t \cup \{\hat{n}_t\}$ and $E'=\{(u,v) \in E: u \in V' \wedge v \in V'\}$;
   evaluating similarities between the first prototype node and remaining nodes, with $\hat{n}_t$ denoting the first prototype node and $n_i$ another being another node in the graph G' and if $S(\hat{n}_t, n_i) \geq \kappa$, an edge is added between $\hat{n}_t$ and $n_i$ into E'; and
   repeating the steps of identifying a most reliable cluster, defining next prototype nodes, replacing the next prototype node for the most reliable cluster, updating the graph, and evaluating similarity between prototype nodes and remaining objects of the graph, wherein said identifying the most reliable cluster of nodes within the graph includes partitioning the graph to define isolated nodes for each partition segment and then merging the nodes.

8. The method of clustering objects of claim 7, wherein said identifying the most reliable cluster of nodes includes an approximation algorithm.

9. The method of clustering objects of claim 7, wherein said identifying the most reliable cluster of nodes includes increasing a threshold $\kappa$ until a size of a largest connected component in the graph is below a specified maximum number.

10. The method of clustering objects of claim 7, wherein said defining a prototype node includes using a mean or median of the cluster or its medoid.

11. A method for clustering similar objects together, the method comprising:
    establishing pairwise similarity between a set of objects to define a set of edges between multiple nodes of a graph;
    identifying a most reliable cluster of nodes within the graph;
    defining a first prototype node and replacing the most reliable cluster of nodes with the first prototype node;
    updating the graph with the first prototype node;
    evaluating pairwise similarity between the first prototype node and other remaining nodes of the graph to define a first set of edges between multiple nodes of the graph;
    identifying a next most reliable cluster of nodes within the graph;
    defining a second prototype node and replacing the next most reliable cluster of nodes with the second prototype node;
    updating the graph with the second prototype node;
    evaluating pairwise similarity between the second prototype node and remaining nodes of the graph to define a second set of edges between multiple nodes of the graph; and
    repeating said identifying the next most reliable cluster of nodes, defining subsequent prototype nodes, and evaluating pairwise similarity between the nodes, with said identifying the next most reliable cluster of nodes within the graph including partitioning the graph to define isolated nodes for each partition segment, then applying a clustering process to each of the isolated nodes, and then merging the isolated nodes.

12. The method of clustering similar objects together of claim 11, wherein the most reliable cluster of nodes is the largest clique of the graph.

13. The method of clustering similar objects together of claim 11, wherein said identifying the most reliable cluster of nodes includes increasing a threshold $\kappa$ until a size of a largest connected component in the graph is below a specified maximum number.

14. The method of clustering similar objects together of claim 11, wherein said identifying the most reliable cluster of nodes within the graph includes partitioning the graph to define isolated nodes for each partition segment and then merging the nodes.

15. The method of clustering similar objects together of claim 11, wherein said identifying the most reliable cluster of nodes includes partitioning the graph into connected subcomponents and applying a clustering process to each of the connected subcomponents.

16. The method of cluster similar objects together of claim 7, wherein the most reliable cluster of nodes is the largest clique of the graph.

* * * * *